US006985894B2

(12) United States Patent
Ebata

(10) Patent No.: US 6,985,894 B2
(45) Date of Patent: Jan. 10, 2006

(54) DOCUMENT MANAGEMENT METHOD AND COMPUTER-READABLE STORAGE MEDIUM STORING PROGRAM CODE FOR EXECUTING THE SAME

(75) Inventor: Jun Ebata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 814 days.

(21) Appl. No.: 09/838,268

(22) Filed: Apr. 20, 2001

(65) Prior Publication Data

US 2002/0007375 A1 Jan. 17, 2002

(30) Foreign Application Priority Data

Apr. 21, 2000 (JP) .............................. 2000-121843

(51) Int. Cl.
*G06F 17/30* (2006.01)
(52) U.S. Cl. ........................... 707/3; 707/102; 715/523
(58) Field of Classification Search .............. 707/1–10, 707/100–104.1, 200–206; 715/515, 522, 715/523
See application file for complete search history.

(56) References Cited

U.S. PATENT DOCUMENTS

| 5,742,816 | A | * | 4/1998 | Barr et al. ..................... 707/3 |
| 6,094,649 | A | * | 7/2000 | Bowen et al. .................. 707/3 |
| 6,397,231 | B1 | * | 5/2002 | Salisbury et al. ........... 715/515 |
| 6,466,942 | B1 | * | 10/2002 | Tolkin ........................ 707/102 |

* cited by examiner

*Primary Examiner*—Shahid Alam
*Assistant Examiner*—Jean Boite Fleurantin
(74) *Attorney, Agent, or Firm*—Oblon, Spivak, McClelland, Maier & Neustadt, P.C.

(57) ABSTRACT

A document management method uses a plurality of document schemas to manage a document retrieval request, the document schemas defining a structure of document contents, each document schema including a plurality of attributes. In the document management method, a schema identifier is assigned to each of the plurality of document schemas by generating a global unique identifier value every time a schema name of a new document schema is input. An attribute identifier is assigned to each of the plurality of attributes of one of the plurality of document schemas by generating another global unique identifier value.

10 Claims, 12 Drawing Sheets

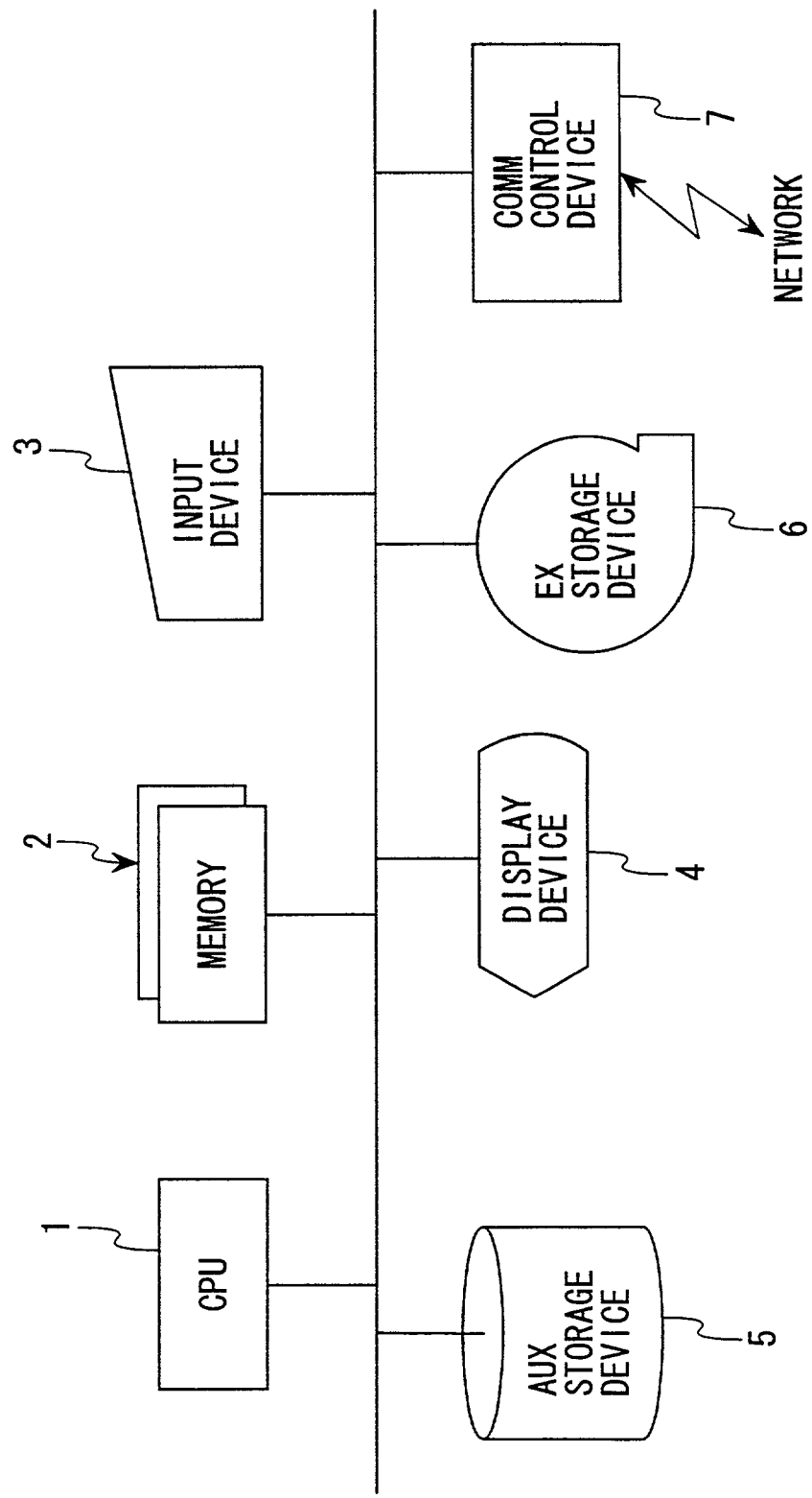

FIG.2

```
SCHEMA ID=(6E439683-C509-11CF-AAFA-00AA00B6015C)
  SCHEMA NAME=CONTRACT DOCUMENTS
 NO. OF ATTRIBUTES=11

ATTR SCHEMA ID=(6E479683-C509-11CF-AAFA-00AA00B6015C)
 ATT    SCHEMA NAME=SENDING DOCUMENTS
 ATT   NO. OF ATTRIBUTES=7
 ATT
 DIS
 ATT  ATTR SCHEMA ID=(6E449683-C509-11CF-AAFA-00AA00B6015C)
  CO   ATT   SCHEMA NAME=RECEIVED DOCUMENTS
       ATT  NO. OF ATTRIBUTES=7
       DIS
ATTR   ATT ATTRIBUTE1
 ATT    CO   ATTRIBUTE NAME='DOCUMENT NAME'
 ATT         ATTRIBUTE ID=(6E449679-C509-11CF-AAFA-00AA00B6015C)
 DIS         DISPLAY ORDER=1
 ATT  ATTR   ATTRIBUTE TYPE=STRING
  CO   ATT     CORRES. FIELD='STRING1'
       ATT
       DIS  ATTRIBUTE2
ATTR   ATT    ATTRIBUTE NAME='ENTRY DATE'
 ATT    CO   ATTRIBUTE ID=(6E449661-C509-11CF-AAFA-00AA00B6015C)
 ATT         DISPLAY ORDER=3
 DIS         ATTRIBUTE TYPE=DATE TIME
 ATT  ATTR     CORRES. FIELD='DATE TIME1'
  CO   ATT
       ATT  ATTRIBUTE3
       DIS    ATTRIBUTE NAME='ENTRY PERSON'
       ATT   ATTRIBUTE ID=(6E449653-C509-11CF-AAFA-00AA00B6015C)
        CO   DISPLAY ORDER=2
             ATTRIBUTE TYPE=STRING
               CORRES. FIELD='STRING2'

| DOCUMENT ID | SCHEMA ID | String1 | String2 | ... | Numeric1 | ... | Date | Time1 | ... |
|---|---|---|---|---|---|---|---|---|---|
| 1 | 1 | | | | | | | | |
| 2 | 1 | | | | | | | | |
| 3 | 1 | | | | | | | | |
| 4 | 2 | | | | | | | | |
| 5 | 3 | | | | | | | | |
| 6 | 2 | | | | | | | | |
| 7 | 2 | | | | | | | | |

QUERY INPUT BY OPERATER

QUERY CONVERSION PROCESS

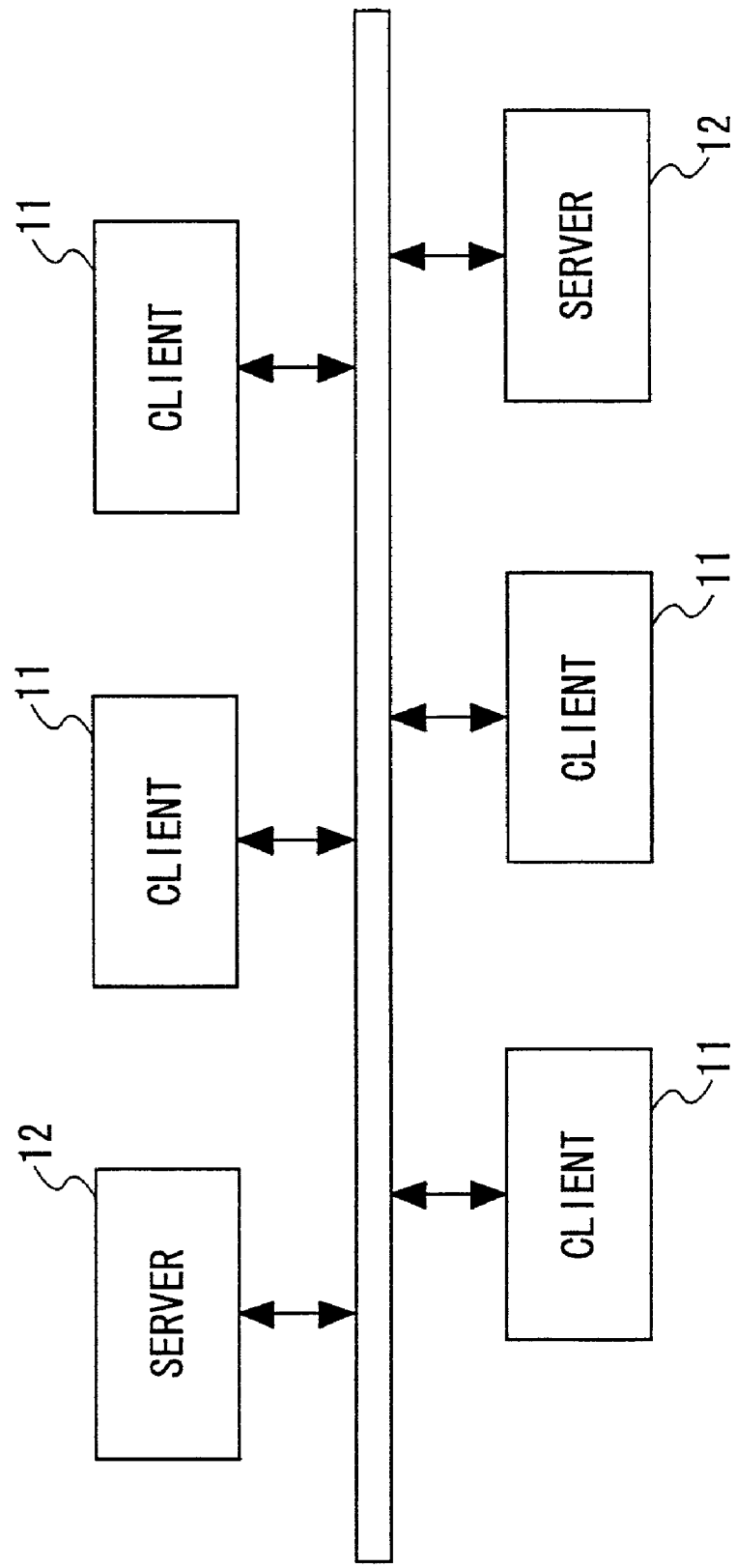

FIG.11

```
SCHEMA ID=3
  SCHEMA NAME=CONTRACT DOCUMENTS
  NO. OF ATTRIBUTES=11

SCHEMA ID=2
     SCHEMA NAME=SENDING DOCUMENTS
     NO. OF ATTRIBUTES=7

SCHEMA ID=1
         SCHEMA NAME=RECEIVED DOCUMENTS
         NO. OF ATTRIBUTES=7

ATTRIBUTE1
           ATTRIBUTE NAME='DOCUMENT NAME'
           DISPLAY ORDER=1
           ATTRIBUTE TYPE=STRING
             CORRES. FIELD='STRING1'

ATTRIBUTE2
           ATTRIBUTE NAME='ENTRY DATE'
           DISPLAY ORDER=3
           ATTRIBUTE TYPE=DATE TIME
             CORRES. FIELD='DATE TIME1'

ATTRIBUTE3
           ATTRIBUTE NAME='ENTRY PERSON'
           DISPLAY ORDER=2
           ATTRIBUTE TYPE=STRING
             CORRES. FIELD='STRING2'

.
                  .
                  .
``` ed with the attribute data into the specified folder of the document storage device of the server 12.

DOCUMENT MANAGEMENT METHOD AND COMPUTER-READABLE STORAGE MEDIUM STORING PROGRAM CODE FOR EXECUTING THE SAME

BACKGROUND OF THE INVENTION

1. Field of the Invention

The present invention relates to a document management method which uses a plurality of document schemas to manage a document retrieval request, the document schemas defining a structure of document contents, each document schema including a plurality of attributes. Further, the present invention relates to a computer readable storage medium storing program code instructions for causing a processor to execute the document management method.

2. Description of the Related Art

FIG. 10 shows a conventional document management system. As shown in FIG. 10, the conventional document management system is configured into a network system including one or a plurality of client workstations 11 (such as personal computers) and one or a plurality of document management servers 12. Each server 12 includes a document storage device having a plurality of folders each containing various document data. The document storage device may be constituted by a hard disk drive or a compact disk drive. Each client workstation 11 includes a similar document storage device containing various document data.

When storing new document data into the document storage device of the server 12, the user gives to the server 12 the document content to be stored as well as the document attributes, such as the document name, the entry person name and the keywords. At the same time, the user specifies the identifier of the folder in which the document content is to be stored. In response to this request, a document management unit of the server 12 adds the document attributes from the user and the entry date obtained from a clock or the like to a document attribute management table. Further, the document management unit stores the document content linked with the attribute data into the specified folder of the document storage device of the server 12.

When sending a document retrieval request to the server 12, the user gives to the server 12 a query condition including the document attribute data, the folder identifier and the document name, and so on. In response to the document retrieval request, the document management unit of the server 12 searches for the requested document data, produces a list of document retrieval results, and causes the client workstation 11 at the user's location to display the list of document retrieval results. When the user selects one of the document retrieval results in the list, the document management unit of the server 12 causes the client workstation 11 to display the document data corresponding to the selected item. If necessary, the user prints out the document data at the client workstation 11.

FIG. 11 shows a document schema file used by a conventional document management method.

As shown in FIG. 11, the document schema file contains a plurality of document schemas. The document schemas in the document schema file are used to define a structure of document contents stored in a conventional document management system. For example, each document schema is comprised of a schema ID (identifier), a schema name, the total number of attributes contained in the document schema, and a plurality of individual document attributes.

As shown in FIG. 11, each of the attributes of one document schema is comprised of an attribute number, an attribute name, the display order, an attribute type, and a corresponding field of a document attribute management table.

The schema ID provides identification of a specific one of the plurality of document schemas. The attribute type provides a specific type of data selected from among various data types including a string type, a numeric type and a date/time type. The corresponding field provides the name of a corresponding field in the document attribute management table. The document schema file shown in FIG. 11 is used to define a structure of the document contents stored in the document management system, and the plurality of document schemas are used when a document retrieval request is input.

FIG. 12 shows a document registration process that is executed according to the conventional document management method.

As shown in FIG. 12, at a start of the document registration process, the document content is registered (S51). After the step S51 is performed, the user selects one of the plurality of document schemas for subsequent registration of the document attributes (S52). The system displays the attribute input menu of the attribute items in the display order defined by the selected document schema (S53). The system stores the document attribute data, which are input by the user from the attribute input menu, into the corresponding fields of the document attribute management table in accordance with the definition of the selected document schema (S54).

However, it is difficult that the conventional document management method creates a new document schema to a plurality of document schemas of a document schema file stored in a document management system without causing an error. It is difficult that the conventional document management method changes, adds or deletes the attributes of a plurality of document schemas of a document schema file stored in a document management system without causing mismatch or contradiction. Further, it is difficult that the conventional document management method changes, when the attributes of the changed document schema (or the new one) and the attributes of the non-changed document schema (or the previous one or the backup copy) coexist in a document management system, the attributes of the non-changed document schema to those of the changed document schema without causing an error.

SUMMARY OF THE INVENTION

It is an object of the present invention to provide an improved document management method in which the above-described problems are eliminated.

Another object of the present invention is to provide a document management method that allows the operator to easily and safely create a new document schema to a plurality of document schemas of a document schema file stored in a document management system.

Another object of the present invention is to provide a document management method that allows the operator to easily and safely change, add or delete the attributes of a plurality of document schemas of a document schema file stored in a document management system.

Another object of the present invention is to provide a document management method that allows the operator to easily and speedily change, when the attributes of the changed document schema and the attributes of the non-changed document schema coexist in a document management system, the attributes of the non-changed document schema to those of the changed document schema.

Another object of the present invention is to provide a computer readable storage medium storing program code instructions for causing the processor to carry out the document management method.

The above-mentioned objects of the present invention are achieved by a document management method which uses a plurality of document schemas to manage a document retrieval request, the document schemas defining a structure of document contents, each document schema including a plurality of attributes, the method comprising the steps of: assigning a schema identifier to each of the plurality of document schemas by generating a global unique identifier value every time a schema name of a new document schema is input; and assigning an attribute identifier to each of the plurality of attributes of one of the plurality of document schemas by generating another global unique identifier value.

The above-mentioned objects of the present invention are achieved by a computer readable storage medium storing program code instructions for causing a processor to execute a document management method, the document management method using a plurality of document schemas to manage a document retrieval request, the document schemas defining a structure of document contents, each document schema including a plurality of attributes, the computer readable storage medium comprising: a first program code means which causes the processor to assign a schema identifier to each of the plurality of document schemas by generating a global unique identifier value every time a schema name of a new document schema is input; and a second program code means which causes the processor to assign an attribute identifier to each of the plurality of attributes of one of the plurality of document schemas by generating another global unique identifier value.

In the document management method of the present invention, it is possible to easily and safely create a new document schema to the plurality of document schemas of the document schema file stored in the document management system. It is possible to easily and safely change, add or delete the attributes of the plurality of document schemas of the document schema file stored in the document management system. Further, when the attributes of the changed document schema and the attributes of the non-changed document schema coexist, it is possible to easily and speedily change the attributes of the non-changed document schema to those of the changed document schema.

BRIEF DESCRIPTION OF THE DRAWINGS

Other objects, features and advantages of the present invention will be apparent from the following detailed description when read in conjunction with the accompanying drawings.

FIG. 1 is a block diagram of a document management system that carries out an embodiment of the document management method of the invention.

FIG. 2 is a diagram for explaining a document schema file that is used by the document management method of the invention.

FIG. 3 is a diagram for explaining a document attribute management table that is used by the document management method of the invention.

FIG. 10 is a block diagram of a conventional document management system.

FIG. 11 is a diagram for explaining a document schema file used by a conventional document management method.

DETAILED DESCRIPTION OF PREFERRED EMBODIMENTS

Figure 4:
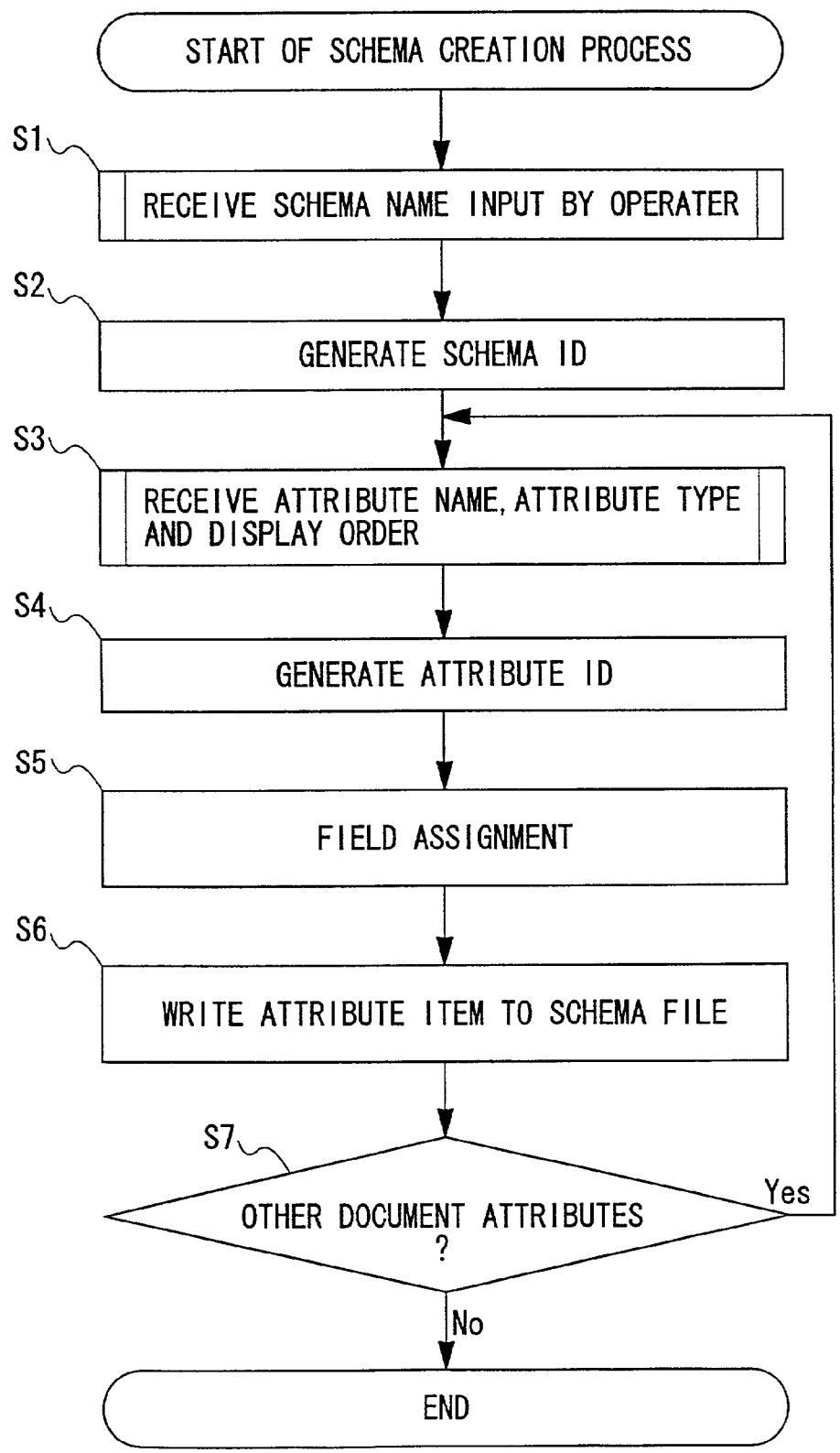
FIG. 4 is a flowchart for explaining a schema creation process that is executed according to a first preferred embodiment of the document management method of the invention.

A description will now be given of preferred embodiments of the present invention with reference to the accompanying drawings.

FIG. 1 shows a document management system that carries out an embodiment of the document management method of the present invention.

As shown in FIG. 1, the document management system generally includes a CPU 1, a memory (for example, RAM) 2, an input device 3, a display device 4, an auxiliary storage device (for example, hard disk drive) 5, an external storage device 6, and a communication control device 7.

In the document management system of FIG. 1, the CPU 1 controls the elements of the system and performs a document management procedure in accordance with a program (or program code instructions). The memory 2 temporarily stores the program and various data and parameters. The input device 3 includes a keyboard, a mouse and the like. The display device 4 displays various data on the display monitor. The auxiliary storage device 5 stores the program, the document contents, the document attributes, and others. The external storage device 6 is provided to accommodate a removable recording medium that is inserted into the device 6. The communication control device 7 allows the CPU 1 to transmit data to and receive data from an external system via a network.

FIG. 2 shows a document schema file that is used by the document management method of the invention.

As shown in FIG. 2, the document schema file contains a plurality of document schemas. The document schemas in the document schema file are used to define a structure of document contents stored in the document management system. For example, each document schema is comprised of a schema ID (identifier), a schema name, the total number of attributes contained in the document schema, and a plurality of individual document attributes.

As shown in FIG. 2, each of the attributes of one document schema is comprised of an attribute number, an attribute name, an attribute ID (identifier), the display order, an attribute type, and a corresponding field of a document attribute management table (which will be described later).

The schema ID provides identification of a specific one of the plurality of document schemas. The attribute ID provides identification of a specific one of the plurality of attributes in one document schema. In the present embodiment, in order to ensure that a unique value in the document schema file is assigned to each of the schema IDs and the attribute IDs, even in the distributed environments, a GUID (global unique identifier) value is used. The attribute type provides a specific type of data selected from among various data types including a string type, a numeric type and a date/time type. The corresponding field provides the name of a corresponding field in the document attribute management table.

The document schema file of FIG. 2 is different from the conventional document schema file of FIG. 11 in that the attribute ID is added for each of the individual document attributes, and the attribute ID has a unique value that identifies a specific one of the plurality of attributes of one document schema within the entire document management system.

The use of the attribute ID in the document schemas makes it possible to easily and speedily find out which attribute has been changed when the document schema is changed. For example, when the attributes of the changed document schema (the new one) and the attributes of the non-changed document schema (the previous one or the backup copy) coexist in the document management system, the attributes of the non-changed document schema can be easily and speedily changed to those of the changed document schema according to the present invention.

FIG. 3 shows a document attribute management table that is used by the document management method of the present invention.

In the document attribute management table of FIG. 3, "String1", "String2", . . . indicate the fields to which the character type attributes among the attributes defined by the related document schema are assigned. "Numeric1", "Numeric2", . . . indicate the fields to which the numeral type attributes among the attributes defined by the related document schema are assigned. "DateTime1", "DateTime2", . . . indicate the fields to which the date/time type attributes among the attributes defined by the related document schema are assigned. When a different schema ID is indicated, a different value is assigned to the attribute even if the attribute indicates the same field.

FIG. 4 shows a schema creation process that is executed according to a first preferred embodiment of the document management method of the invention.

In the present embodiment, the CPU 1 of the document management system of FIG. 1 executes the schema creation process of FIG. 4 (and the processes shown in FIG. 5 and FIG. 6) in accordance with the program code instructions. Hereinafter, for the sake of convenience of description, the CPU 1 will be referred to as the processor, and the program code instructions will be called the program code.

As shown in FIG. 4, at a start of the schema creation process, the program code causes the processor to receive a schema name input by the operator in order for creating a new document schema (S1). After the step S1 is performed, the program code causes the processor to assign a schema ID to the schema name of the new document schema by generating a GUID value (S2).

Alternatively, at the step S2, the program code may cause the processor to control the communication control device 7 such that the processor receives a schema ID (which has a GUID value) from an external document management system via the network and assigns the schema ID to the schema name of the new document schema.

After the step S2 is performed, with respect to one of the plurality of attributes defined by the new document schema, the program code causes the processor to receive an attribute name, an attribute type and a display order, which are input by the operator for the related attribute among the attributes of the new document schema (S3).

After the step S3 is performed, the program code causes the processor to assign an attribute ID to the related attribute among the attributes of the new document schema by generating a GUID value (S4). After the step S4 is performed, the program code causes the processor to assign a field of the document attribute management table for the related attribute (S5). After the step S5 is performed, the program code causes the processor to write the attribute items (obtained at the steps S3 through S5) to the document schema file (S6).

After the step S6 is performed, the program code causes the processor to determine whether another attribute is included in the attributes defined by the new document schema but still remains unprocessed (S7). When the result at the step S7 is affirmative, the control of the processor is transferred to the step S3 for processing of the next attribute of the new document schema. Otherwise it is determined that all the attributes of the related document schema are processed. The schema creation process of FIG. 4 ends.

According to the document management method of the above-described embodiment, the operator can easily and safely create a new document schema, including the desired attributes thereof, to the plurality of document schemas of the document schema file registered in the document management system.

Figure 5:
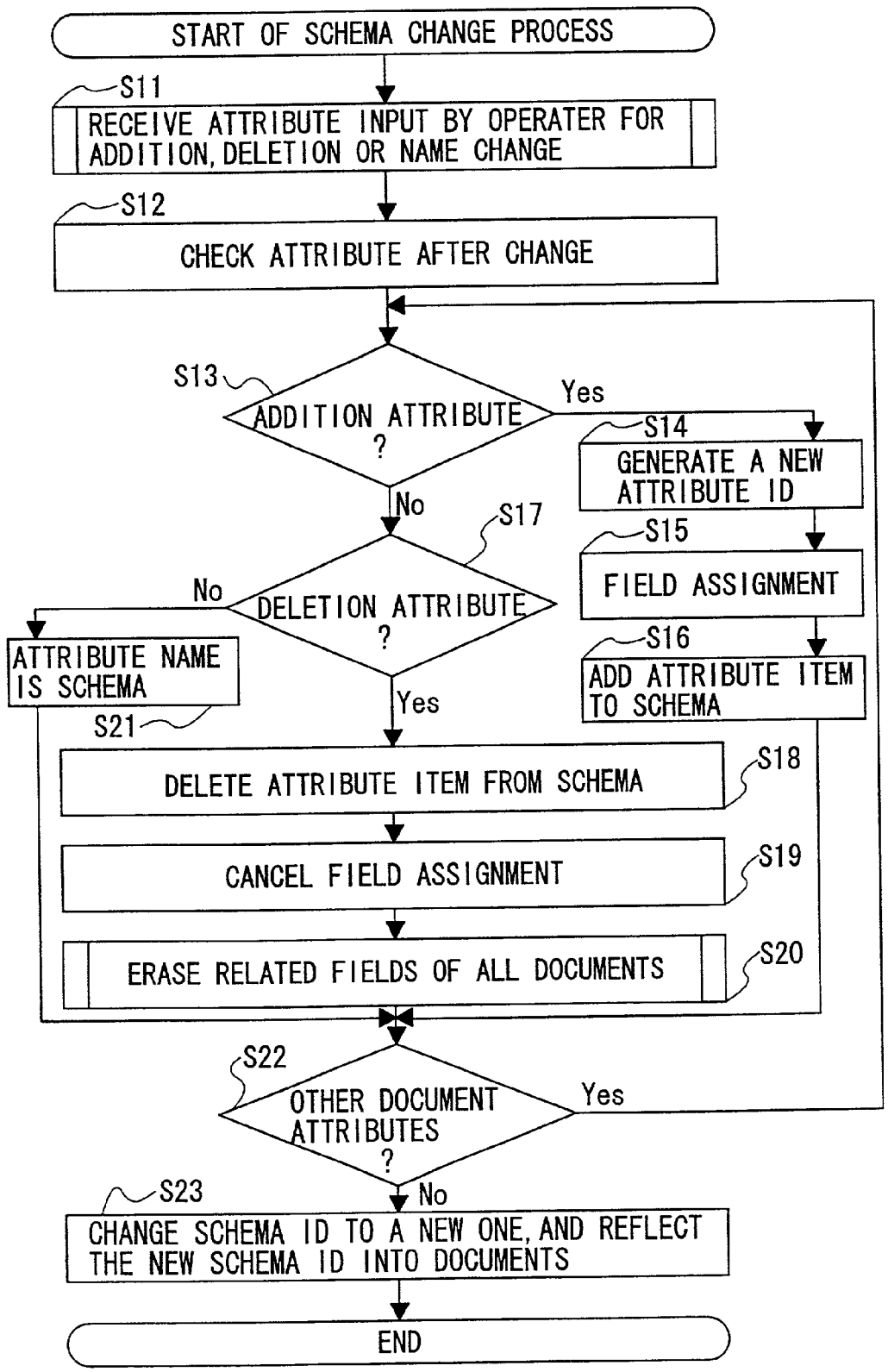
FIG. 5 is a flowchart for explaining a schema change process that is executed according to the document management method of the present embodiment.

FIG. 5 shows a schema change process that is executed according to the document management method of the present embodiment.

As shown in FIG. 5, at a start of the schema change process, the program code causes the processor to receive an attribute item of a certain document schema, input by the operator in order for addition, deletion or name change of the attribute item of the document schema (S11). In the step S11, the program code may cause the processor to control the display device 4 to display an operational message that asks the operator to input any attribute item from the input device 3.

After the step S11 is performed, the program code causes the processor to check the correctness of the received attribute item after the intended change is made (S12).

After the step S12 is performed, with respect to one of the plurality of attributes defined by the related document schema, the program code causes the processor to determine whether the purpose of the received attribute item is the addition to the related document schema (S13). When the result at the step S13 is affirmative, the control of the processor is transferred to step S14. Otherwise the control of the processor is transferred to the next step S17.

When the received attribute item is the addition attribute, the program code causes the processor to assign a new attribute ID to the received attribute item by generating a GUID value (S14). After the step S14 is performed, the program code causes the processor to assign a new field of the document attribute management table for the related attribute (S15). After the step S15 is performed, the program code causes the processor to add the information of the received attribute item (obtained at the steps S14 and S15) to the document schema file (S16). After the step S16 is performed, the control of the processor is transferred to step S22, which will be described later.

When the received attribute item is not the addition attribute as a result of the step S13, the program code causes the processor to determine whether the purpose of the received attribute item is the deletion from the related document schema (S17). When the result at the step S17 is affirmative, the control of the processor is transferred to next step S18. Otherwise the control of the processor is transferred to step S21.

When the received attribute item is the deletion attribute, the program code causes the processor to delete the attribute item (which is the same as that input by the operator) from the related document schema (S18). After the step S18 is performed, the program code causes the processor to cancel the field assignment of the attribute item in the document attribute management table (S19). After the step S19 is performed, the program code causes the processor to erase the corresponding field of the attribute item in the document schema file (S20). After the step S20 is performed, the control of the processor is transferred to next step S22.

When the received attribute item is not the deletion attribute as a result of the step S17, it is determined that the purpose of the received attribute item is the name change. The program code causes the processor to reflect the new attribute name (or the received attribute item) into the document schema (S21). After the step S21 is performed, the control of the processor is transferred to next step S22.

After any of the steps S16, S20 and S21 is performed, the program code causes the processor to determine whether another attribute is included in the attributes of the related document schema but still remains unprocessed (S22).

When the result at the step S22 is affirmative, the control of the processor is transferred to the above step S13 for processing of the next attribute in the related document schema. Otherwise it is determined that all the attributes of the related document schema are processed. The program code causes the processor to change the schema ID of the related document schema to a new schema ID (which is assigned by generating a GUID value) and reflect the new schema ID into the documents pertaining to the related document schema (S23). After the step S23 is performed, the schema change process of FIG. 5 ends.

According to the document management method of the above-described embodiment, the operator can arbitrarily change, add or delete the attributes of the document schemas of the document schema file stored in the document management system.

Figure 6:
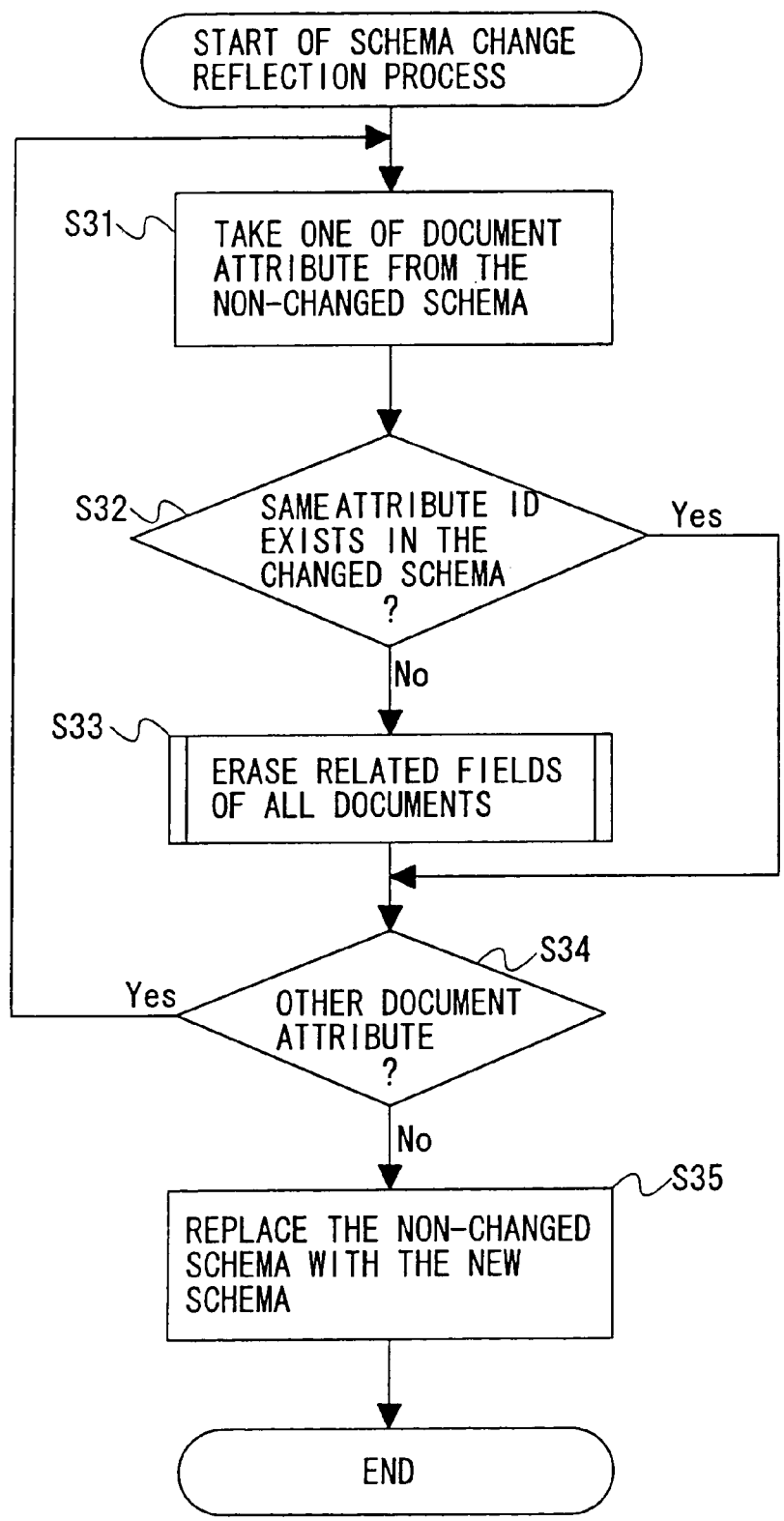
FIG. 6 is a flowchart for explaining a schema change reflection process that is executed according to the document management method of the present embodiment.

FIG. 6 shows a schema change reflection process that is executed according to the document management method of the present embodiment.

For example, when the attributes of the changed document schema and the attributes of the non-changed document schema coexist in a document space of the document management system and the operator desires to change the attributes of the non-changed document schema to those of the changed document schema so as to avoid mismatch or contradiction, the schema change reflection process of FIG. 6 is carried out.

As shown in FIG. 6, at a start of the schema change reflection process, the processor (or the CPU 1) reads the non-changed document schema and the previous document attribute management table pertaining to the non-changed document schema from the removable recording medium provided on the external storage device 6. Further, the processor reads the changed document schema and the current document attribute management table pertaining to the changed document schema from the auxiliary storage device 5. Then the program code causes the processor to take one of the plurality of attributes defined by the non-changed document schema (S31).

After the step S31 is performed, the program code causes the processor to determine whether the attributes of the changed document schema include an attribute ID that is common to the attributes of the non-changed document schema, through comparison between the attribute IDs of both the changed document schema and the non-changed document schema (S32).

When the result at the step S32 is negative, the attributes of the changed document schema do not include any attribute ID that is same as the attribute ID of the related document attribute of the non-changed document schema. The program code causes the processor to erase the corresponding fields of all the document IDs in the previous document attribute management table that pertains to the non-changed document schema (S33).

When the result at the step S32 is affirmative, the control of the processor is transferred to step S34 and the processor does not perform the step S33.

After the step S33 is performed (or when the result at the step S32 is affirmative), the program code causes the processor to determine whether another document attribute is included in the document attributes defined by the non-changed document schema but still remains unprocessed (S34).

When the result at the step S34 is affirmative, the control of the processor is transferred to the above step S31 for repeating the processing of the next document attribute. Otherwise it is determined that all the document attributes of the non-changed document schema are processed. The program code causes the processor to replace the attributes of the non-changed document schema with the attributes of the changed document schema having the common attribute IDs (S35). After the step S35 is performed, the schema change reflection process of FIG. 6 ends.

According to the document management method of the above-described embodiment, the operator can easily and speedily change, even in such a situation that the changed document schema and the document attributes pertaining to the non-changed document schema coexist in the document space, the document attributes of the non-changed document schema to those pertaining to the changed document schema.

When the attribute name is changed, the changed document schema can be simply overwritten to the non-changed document schema and any other processing is needed.

In the above-described embodiment, the attribute ID is used, instead of the attribute name, to check the commonality of the attributes between the changed document schema and the non-changed document schema. Similarly, when checking the commonality of the attributes between a basic document schema and a secondary document schema in a certain document space, the attribute ID may be also used instead of the attribute name.

The document management method of the above-described embodiment provides the function to bring the document schema file (FIG. 2), which is provided for the original document management system (FIG. 1) and includes the schema IDs and the attribute IDs, into a second document management system. According to the above-described embodiment, the schema IDs and the attribute IDs of the document schema file can be used to manage a document retrieval request in the second document management system as well. This function will remarkably improve the handling load of the operator who requests a document retrieval to the system wherein the changed document schemas and the non-changed document schemas coexist.

When the document schema file is brought from one document management system into another, the file is temporarily recorded onto the removable recording medium by the external storage device 6, and the recording medium is placed into an external storage device of the second document management system so that the document schema file is stored into an auxiliary storage device of the second document management system.

As described above, by performing the document management method of the above-described embodiment (FIG. 6), the operator can easily and speedily change, when the changed document schema and the document attributes pertaining to the non-changed document schema (or the backup copy) coexist in the document management system, the document attributes of the non-changed document schema to those pertaining to the changed document schema without causing mismatch or contradiction. In the present embodiment, the attribute ID is assigned to each of the document attributes by generating a GUID value in order to ensure that each of the attribute IDs has a unique value in the document schema file. Therefore, the operator can easily and speedily change or update the document attributes of the non-changed document schema without causing mismatch or contradiction.

Figure 7:
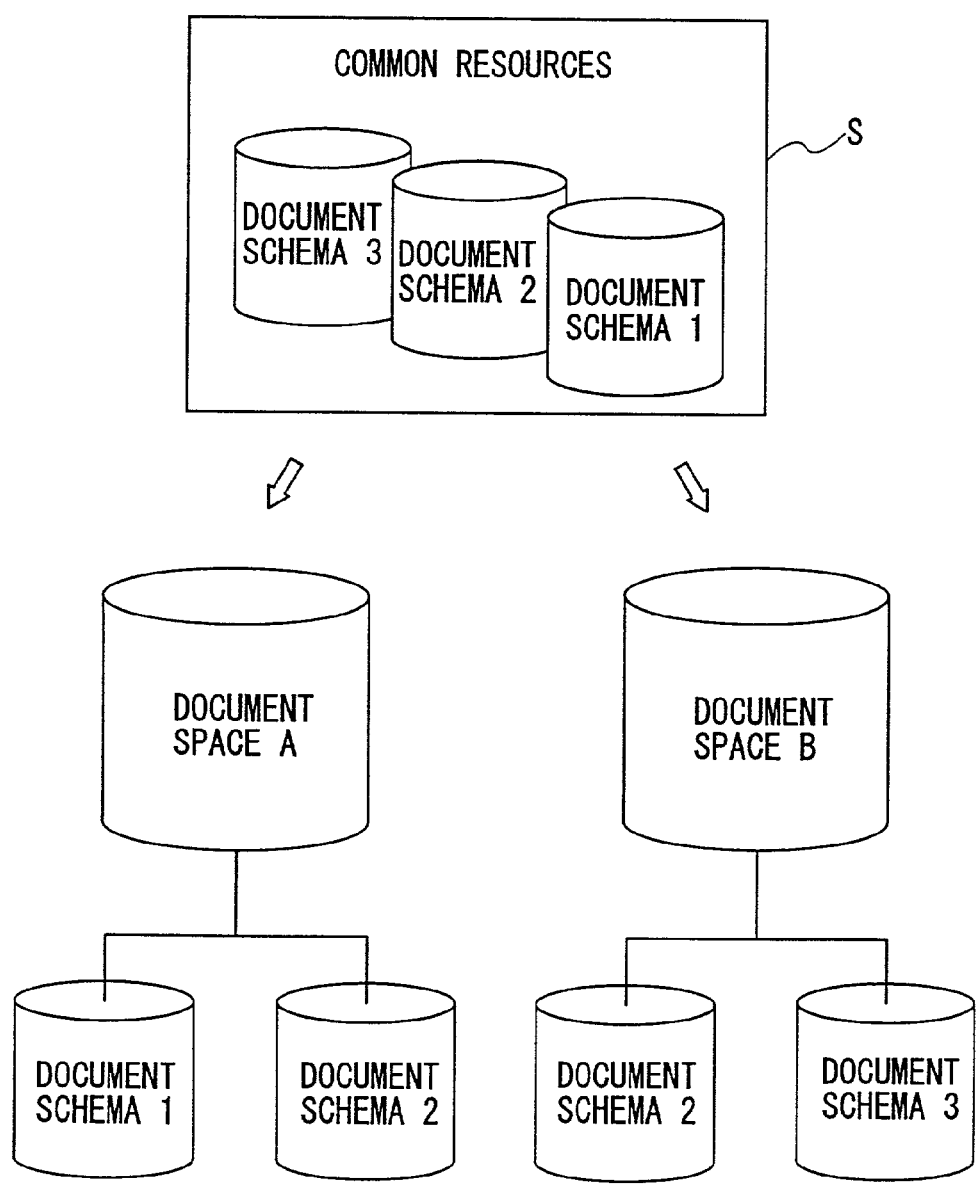
FIG. 7 is a diagram for explaining a document space that is used by the document management system of the invention.

FIG. 7 shows a document space used by the document management system according to the present invention.

As shown in FIG. 7, the document management system has the common resources S in which a plurality of document schemas, such as document schema1, document schema2, and document schama3, are registered. Suppose that the common resources S include a document space A and a document space B. When bringing the document schema file, which is provided for the document space A of the document management system, into a different document management system, a copy of the document schema file is created at the different document management system with document schema1 and document schema2 attached thereto. Therefore, the operator can easily and speedily change the document attributes of the non-changed document schema without causing mismatch or contradiction.

Figure 8A:
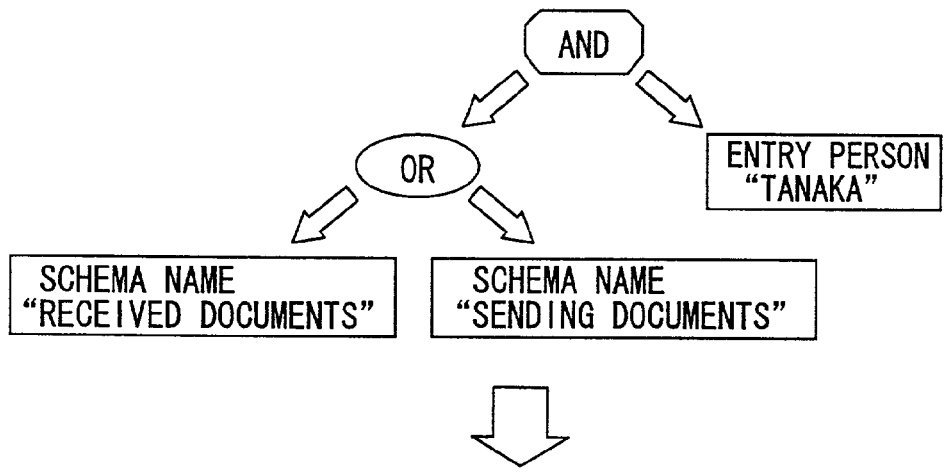
FIG. 8A and FIG. 8B are diagrams for explaining a query conversion process that is performed according to a second preferred embodiment of the document management method of the invention.
Figure 8B:
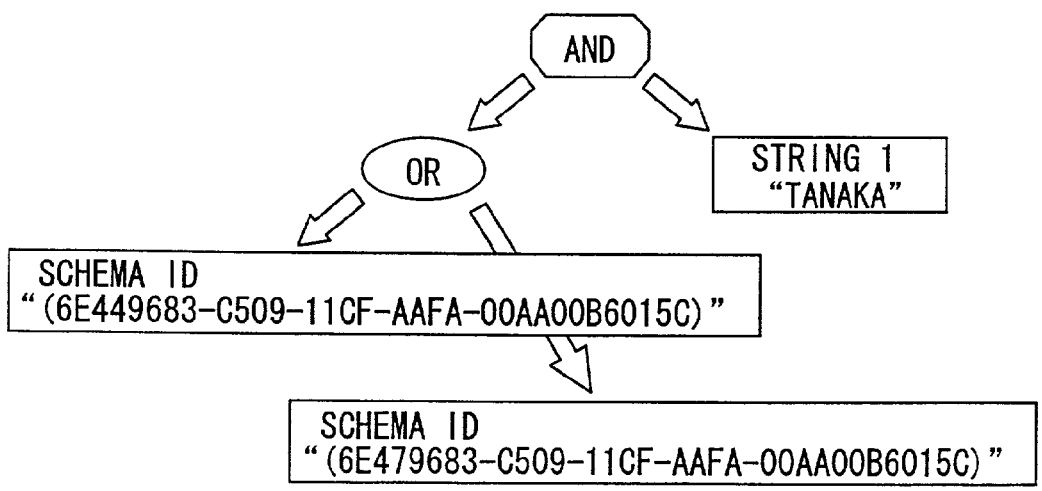

Next, FIG. 8A and FIG. 8B show a query conversion process that is performed according to a second preferred embodiment of the document management method of the invention.

Suppose that, in the present embodiment, a query condition: the schema name "RECEIVED DOCUMENTS" OR the schema name "SENDING DOCUMENTS" AND the entry person "TANAKA", as shown in FIG. 8A, is input by the operator for requesting a document retrieval to the document management system. Normally, the query condition input by the operator includes schema names and attribute names that are connected by Boolean operators (AND, OR, etc.).

According to the second preferred embodiment of the document management method, in response to the query condition, the query conversion process is performed prior to start of the document retrieval. As shown in FIG. 8B, through the query conversion process, the two schema names of the query condition are converted into respective schema IDs, each schema ID using a GUID value, and the attribute name of the query condition is converted into a corresponding field in the document attribute management table as shown in FIG. 3. In the present case of FIG. 8B, the entry person "TANAKA" (the attribute name) is converted into the string1 "TANAKA" of the document attribute management table.

When the document schema file contains two or more document schemas, it is required that the attribute item included in the query condition is shared by all the document schemas of the document schema file. If this requirement is not met by the query condition, an error arises as a result of the query conversion process.

Figure 9:
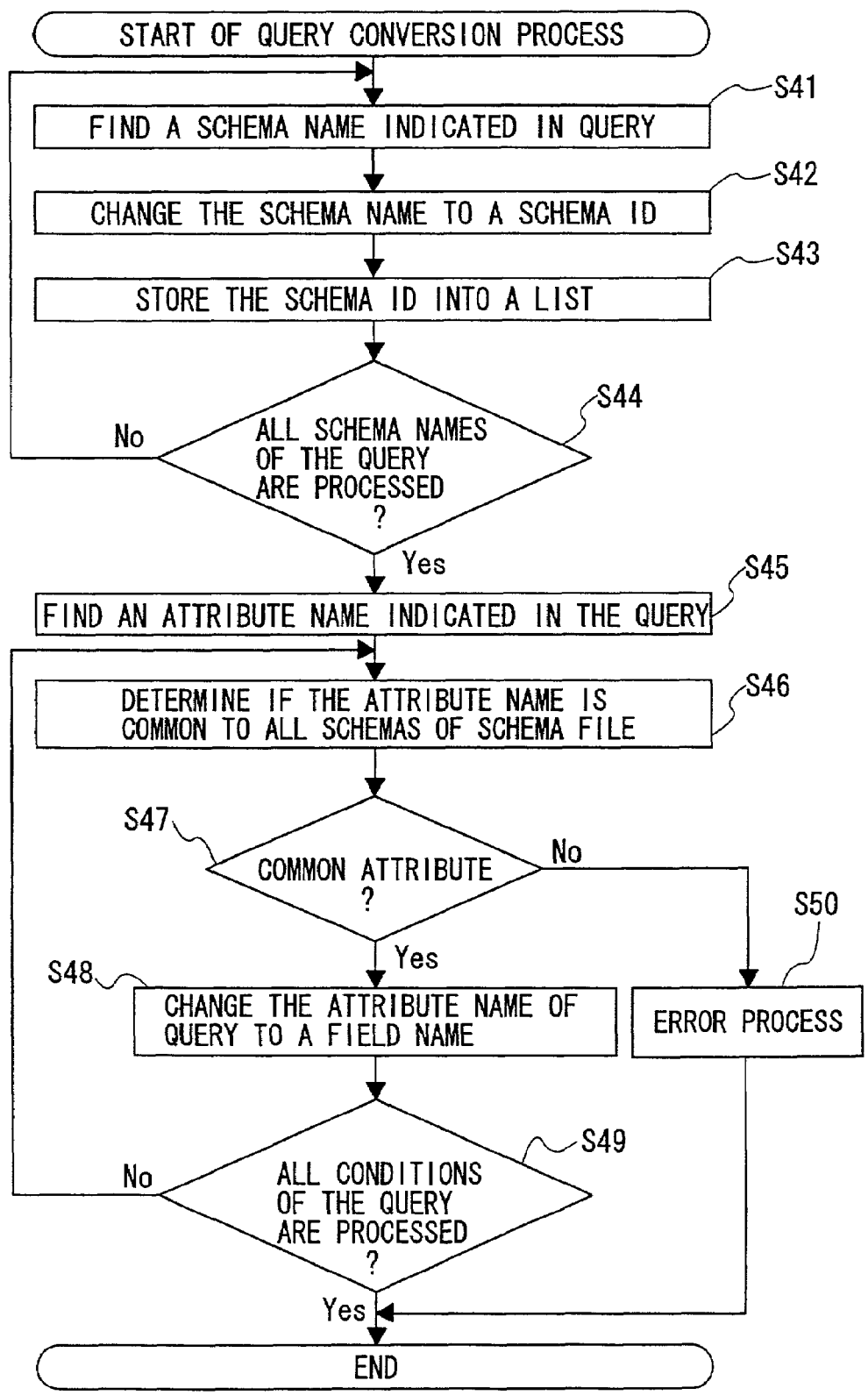
FIG. 9 is a flowchart for explaining a query conversion process that is executed according to the document management method of the present embodiment.
Figure 12:
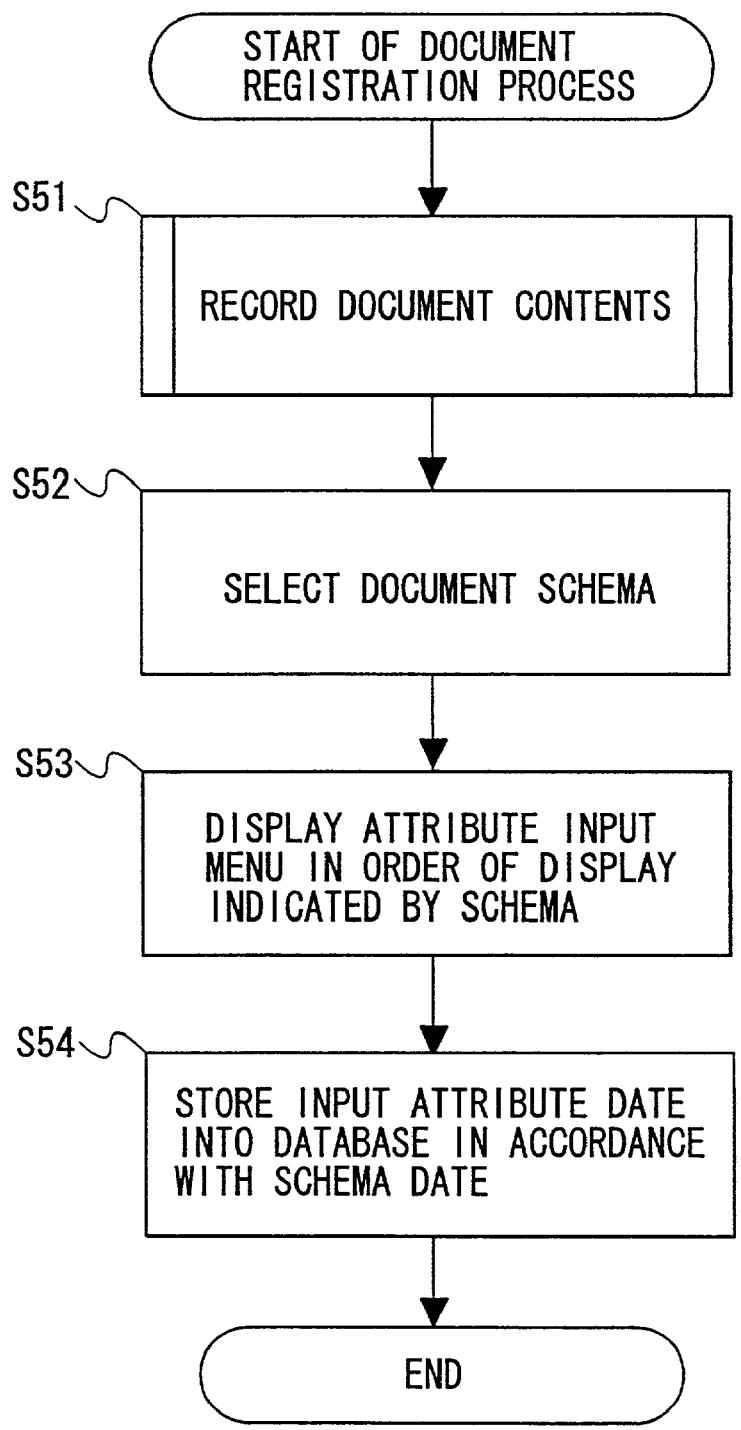
FIG. 12 is a flowchart for explaining a document registration process that is executed according to the conventional document management method.

FIG. 9 shows a query conversion process that is executed according to the second preferred embodiment of the document management method in order to the above-mentioned function shown in FIG. 8B.

In the present embodiment, the CPU 1 of the document management system of FIG. 1 executes the query conversion process of FIG. 9 in accordance with the program code instructions. Hereinafter, for the sake of convenience of description, the CPU 1 will be referred to as the processor, and the program code instructions will be called the program code.

As shown in FIG. 9, at a start of the query conversion process, the program code causes the processor to find a first schema name included in a query condition that is input by the operator in order for requesting a document retrieval (S41).

After the step S41 is performed, the program code causes the processor to read a schema ID of the schema name from the related one of the document schemas of the document schema file and replace the schema name in the query condition with the read schema ID (S42).

After the step S42 is performed, the program code causes the processor to store the obtained schema ID into a schema list that is retained in a given region of the memory 2 (S43).

After the step S43 is performed, the program code causes the processor to determine whether all the schema names included in the query condition are processed (S44). When the result at the step S44 is negative, the control of the processor is transferred to the step S41 for repeating the conversion of the next schema name in the query condition. Otherwise the control of the processor is transferred to next step S45.

When all the schema names included in the query condition are processed as a result of the step S44, it is determined that the schema IDs, derived from all the schema names of the query condition, are stored into the schema list. At this instant, the program code causes the processor to find a first attribute name included in the query condition (S45).

After the step S45 is performed, the program code causes the processor to check that the attribute name of the query condition is shared by the document schemas of the document schema file (S46). At this instant, the program code causes the processor to determine whether the attribute name of the query condition is a common attribute for all the document schemas of the document schema file (S47).

When the result at the step S47 is affirmative, the program code causes the processor to replace the attribute name in the query condition with the string of the corresponding field of the document attribute management table (S48). Otherwise the program code causes the processor to perform an error process (S50). As previously described, if the query condition does not meet the requirement that the attribute item included in the query condition is shared by all the document schemas of the document schema file, an error arises. The error process at the step S50 is performed in order to notify the occurrence of this error during the query conversion process to the CPU 1 of the document management system.

After the step S48 is performed, the program code causes the processor to determine whether all the attribute names included in the query condition are processed (S49). When the result at the step S49 is negative, the control of the processor is transferred to the step S46 for repeating the conversion of the next attribute name in the query condition.

When the result at the step S49 is affirmative, or after the step S50 is performed, the query conversion process of FIG. 9 ends.

The document management method of the above-described embodiment provides the function to request a document retrieval to the system by using the derived query condition instead of the query condition input by the operator. The derived query condition does not include the schema names or the attribute names of the document schema file and includes only the schema IDs and the strings of the corresponding fields of the document attribute management table. Therefore, the document management method of the present embodiment can increase the efficiency of the operator's document retrieval request to the system.

The present invention is not limited to the above-described embodiments, and variations and modifications may be made without departing from the scope of the present invention.

Further, the present invention is based on Japanese priority application No. 2000-121843, filed on Apr. 21, 2000, the entire contents of which are hereby incorporated by reference.

What is claimed is:

1. A document management method which uses a plurality of document schemas to manage a document retrieval request, the document schemas defining a structure of document contents, each document schema including a plurality of attributes, the method comprising:
   assigning a schema identifier to each of the plurality of document schemas by generating a global unique identifier value every time a schema name of a new document schema is input;
   assigning an attribute identifier to each of the plurality of attributes of one of the plurality of document schemas by generating another global unique identifier value;
   determining whether the attributes of a changed document schema include an attribute ID that is common to a non-changed document schema, through comparison between the attribute identifiers of both the changed document schema and the non-changed document schema; and
   replacing the attributes of the non-changed document schema with the attributes of the changed document schema having the common attribute identifiers.

2. The document management method according to claim 1, wherein the plurality of document schemas are contained in a document schema file, the document schema file being stored into a first document management system and containing the schema identifier for each of the document schemas and the attribute identifier for each of the attributes of one of the document schemas, and the document schema file capable of being stored into a second document management system.

3. The document management method according to claim 1, wherein, in assigning the schema identifier, a global unique identifier value is received as a new schema identifier from an external system via a network and the new schema identifier is assigned to one of the plurality of document schemas.

4. The document management method according to claim 1, wherein, when a query condition is input, the document management method carries out a query conversion process for the input query condition, the query conversion process comprising:
   reading a schema identifier, which corresponds to one of schema names in the query condition, from a related one of the plurality of document schemas; and
   replacing each of the schema names in the query condition with the schema identifier.

5. The document management method according to claim 1 wherein, when a query condition is input, the document management method carries out a query conversion process for the input query condition, the query conversion process comprising:
   determining whether one of attribute names included in the query condition is a common attribute shared by the plurality of document schemas; and
   replacing the attribute name in the query condition with a string of a corresponding field of a document attribute management table when said one of the attribute names is the common attribute.

6. A computer readable storage medium storing program code instructions for causing a processor to execute a document management method, the document management method using a plurality of document schemas to manage a document retrieval request, the document schemas defining a structure of document contents, each document schema including a plurality of attributes, comprising:
   first program code means for causing the processor to assign a schema identifier to each of the plurality of document schemas by generating a global unique identifier value every time a schema name of a new document schema is input;
   second program code means for causing the processor to assign an attribute identifier to each of the plurality of attributes of one of the plurality of document schemas by generating another global unique identifier value;
   third program code means for causing the processor to determine whether the attributes of a changed document schema include an attribute ID that is common to a non-changed document schema, through comparison between the attribute identifiers of both the changed document schema and the non-changed document schema; and
   fourth program code means for causing the processor to replace the attributes of the non-changed document schema with the attributes of the changed document schema having the common attribute identifiers.

7. The computer readable storage medium according to claim 6, wherein the plurality of document schemas are contained in a document schema file, the document schema file being stored into a first document management system and containing the schema identifier for each of the document schemas and the attribute identifier for each of the attributes of one of the document schemas, and the document schema file capable of being stored into a second document management system.

8. The computer readable storage medium according to claim 6, wherein the first program code means is configured to cause the processor to receive a global unique identifier value as a new schema identifier from an external system via a network and to assign the new schema identifier to one of the plurality of document schemas.

9. A document management apparatus comprising:
   a schema identifier assigning device configured to assign a schema identifier to each of a plurality of document schemas by generating a global unique identifier value every time a schema name of a new document schema is input, the plurality of document schemas defining a structure of document contents to manage a document retrieval request, each of the plurality of document schemas including a plurality of attributes;

an attribute identifier assigning device configured to assign to each of the plurality of attributes of one of the plurality of document schemas by generating another global unique identifier value;

a control configured to determine whether the attributes of a changed document schema include an attribute ID that is common to a non-changed document schema, through comparison between the attribute identifiers of both the changed document schema and the non-changed document schema, and to replace the attributes of the non-changed document schema with the attributes of the changed document schema having the common attribute identifiers.

10. A computer readable media for controlling a computer to perform:

assigning a schema identifier to each of a plurality of document schemas by generating a global unique identifier value every time a schema name of a new document schema is input, the plurality of document schemas defining a structure of document contents to manage a document retrieval request, each of the plurality of document schemas including a plurality of attributes;

assigning an attribute identifier to each of the plurality of attributes of one of the plurality of document schemas by generating another global unique identifier value;

causing the processor to determine whether the attributes of a changed document schema include an attribute ID that is common to a non-changed document schema, through comparison between the attribute identifiers of both the changed document schema and the non-changed document schema; and causing the processor to replace the attributes of the non-changed document schema with the attributes of the changed document schema having the common attribute identifiers.

* * * * *